United States Patent [19]

Van Wyk

[11] Patent Number: 5,052,824
[45] Date of Patent: Oct. 1, 1991

[54] COMPLIANT SPHERICAL BEARING

[75] Inventor: J. Derek Van Wyk, Dublin, N.H.

[73] Assignee: MPB Corporation, Keene, N.H.

[21] Appl. No.: 639,327

[22] Filed: Jan. 9, 1991

Related U.S. Application Data

[63] Continuation of Ser. No. 476,889, Feb. 8, 1990, abandoned.

[51] Int. Cl.[5] ............................................. F16C 23/04
[52] U.S. Cl. ................................. 384/203; 384/192
[58] Field of Search ........ 384/192, 202, 203, 206–212, 384/215, 216, 495–498

[56] References Cited

U.S. PATENT DOCUMENTS

| 183,023 | 10/1876 | Remsen | 384/202 X |
| 2,952,144 | 9/1960 | Holmes, Jr. | 384/203 |
| 3,004,803 | 10/1961 | Irwin | 384/498 X |
| 3,115,375 | 12/1963 | Haller | 308/72 |
| 3,666,331 | 5/1972 | Curtis et al. | 308/72 |
| 3,700,295 | 10/1972 | Butzow et al. | 308/72 |
| 3,765,733 | 10/1973 | Hackman | 308/72 |
| 3,909,084 | 9/1975 | Snidar et al. | 384/203 |
| 4,055,369 | 10/1977 | Lynn et al. | 308/187.1 |
| 4,105,261 | 8/1978 | Myers et al. | 384/208 |
| 4,331,367 | 5/1982 | Trudeau et al. | 384/202 |
| 4,747,810 | 5/1988 | Shepley et al. | 474/135 |

FOREIGN PATENT DOCUMENTS

| 2923273 | 12/1980 | Fed. Rep. of Germany | 384/202 |
| 687273 | 9/1979 | U.S.S.R. | 384/203 |

Primary Examiner—Thomas R. Hannon
Attorney, Agent, or Firm—Fish & Richardson

[57] ABSTRACT

A self-aligning bearing including a first member having a convex bearing surface and a second member having a concave seat that receives the convex bearing surface of the first member, the second member also having a compliant relief region aligned with and spaced apart from the concave seat, the relief region serving to permit deflection of the second member in response to loading on the first member.

14 Claims, 2 Drawing Sheets

COMPLIANT SPHERICAL BEARING

This is a continuation of copending application Ser. No. 07/476,889 filed on Feb. 8, 1990 now abandoned.

BACKGROUND OF THE INVENTION

The invention relates to self-aligning spherical bearings.

A self-aligning spherical bearing typically includes a spherical ball and a concave spherical seat which closely conforms to and envelops the ball. Such bearings are commonly used to accommodate misalignment between two structure members and to transport both dynamic and static loads. Keeping the load-bearing spherical surface lubricated is often difficult. Thus, a frequently used alternative approach is to use a low-friction liner which greatly reduces the rate of wear in service. These liners, however, are susceptible to repeated heavy loading that may cause the material to "pound-out" or flow, thereby becoming thinner in places. This results in an unacceptably loose fit between the ball and the seat, which in turn further aggravates the problem of "pound-out".

SUMMARY OF THE INVENTION

In general, in one aspect, the invention features a self-aligning bearing including a first member having a convex bearing surface; and a second member having a concave seat that receives the convex bearing surface of the first member, the second member also having a compliant relief region aligned with and spaced apart from the concave seat, the relief region serving to permit deflection of the second member in response to loading on the first member.

Preferred embodiments include the following features. The second member includes a race having the concave seat on one side and an outside surface on an opposed side; and a support member holding the race, the support member having a mounting surface that abuts the outside surface of the race, wherein the compliant relief region is formed in the outside surface. The convex bearing surface is spherically shaped with a radius R. The concave seat is spherically shaped with a radius slightly greater than R. Both the concave seat and the convex bearing surface are treated to increase their wear resistance.

Also in preferred embodiments, the compliant relief region is formed in the mounting surface.

An advantage of the invention is that it reduces the "pound-out" which occurs at the interface between the ball and the seat in a spherical bearing. The invention permits greater deflection of the seat under load conditions and thus reduces the possibility of a permanent deformation of the interface of the ball and the seat.

Other advantages and features will become apparent from the following description of the preferred embodiment and from the claims.

DESCRIPTION OF THE PREFERRED EMBODIMENT

STRUCTURE AND OPERATION

Figure 1:
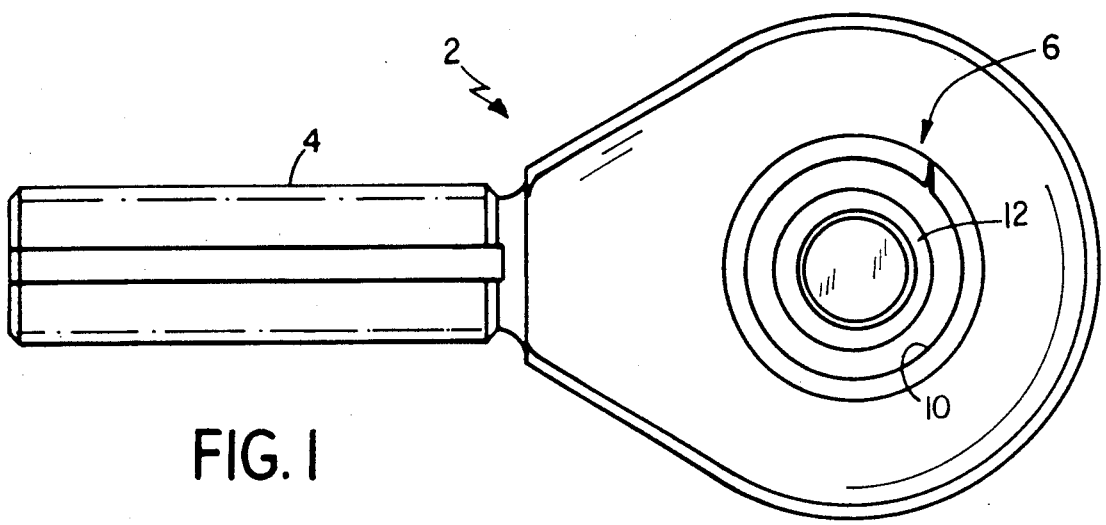
FIG. 1 shows a tie rod end including a spherical bearing.
Figure 2:
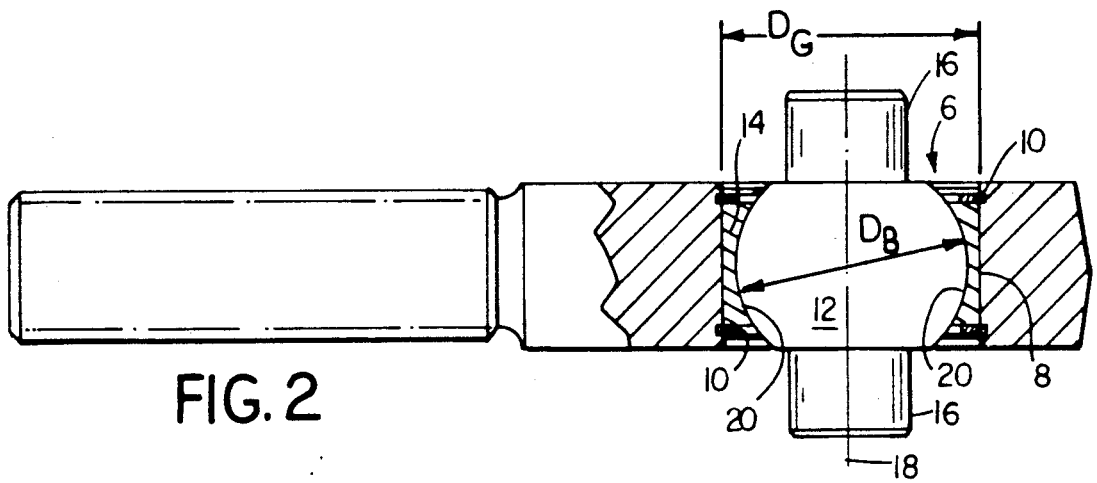
FIG. 2 shows the tie rod end with a cutaway view of the spherical bearing.

FIGS. 1 and 2 illustrate a tie rod end 2 such as might be used in the front steering system of an automobile. Tie rod end 2 includes a threaded stud 4 which can be screwed into a tie rod (not shown) and it includes a spherical self-aligning bearing 6 that is held within a bore 8 by two retaining rings 10. Bearing 6 has two components, namely, a ball 12 and a cylindrically shaped split race 14 which retains ball 12 in tie rod end 2. Ball 12 has an outside diameter, $D_B$, e.g. of 1.88 inches, and includes opposed integral studs 16 which are aligned along an axis 18 and which provide locations for attaching ball 12 to another structure such as a wheel suspension member. Split race 14 has an outer diameter, $D_G$, e.g. of approximately 2.125 inches, and it has a concave spherical seat 20 with a radius of curvature, R, slightly greater than 0.99 inch (e.g. approximately 0.992 inch). When ball 12 is assembled into race 14, seat 20 closely conforms to and envelops ball 12. Split race 14 permits ball 12 to rotate about axis 18 and to rotate within tie rod end 2 over a restricted range in other directions.

In addition to retaining rings 10, split race 14 is firmly held within bore 8 by an interference fit between it and tie rod end 2. Thus, split race 14 resists movement within bore 8 when a force is exerted on ball 12.

Figure 3:
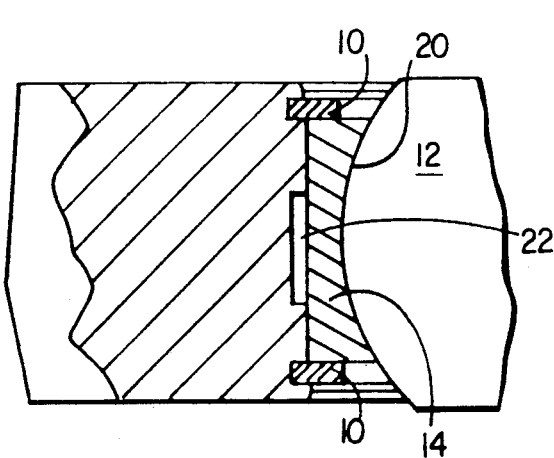
FIG. 3 shows the relief region in the split race.
Figure 5:
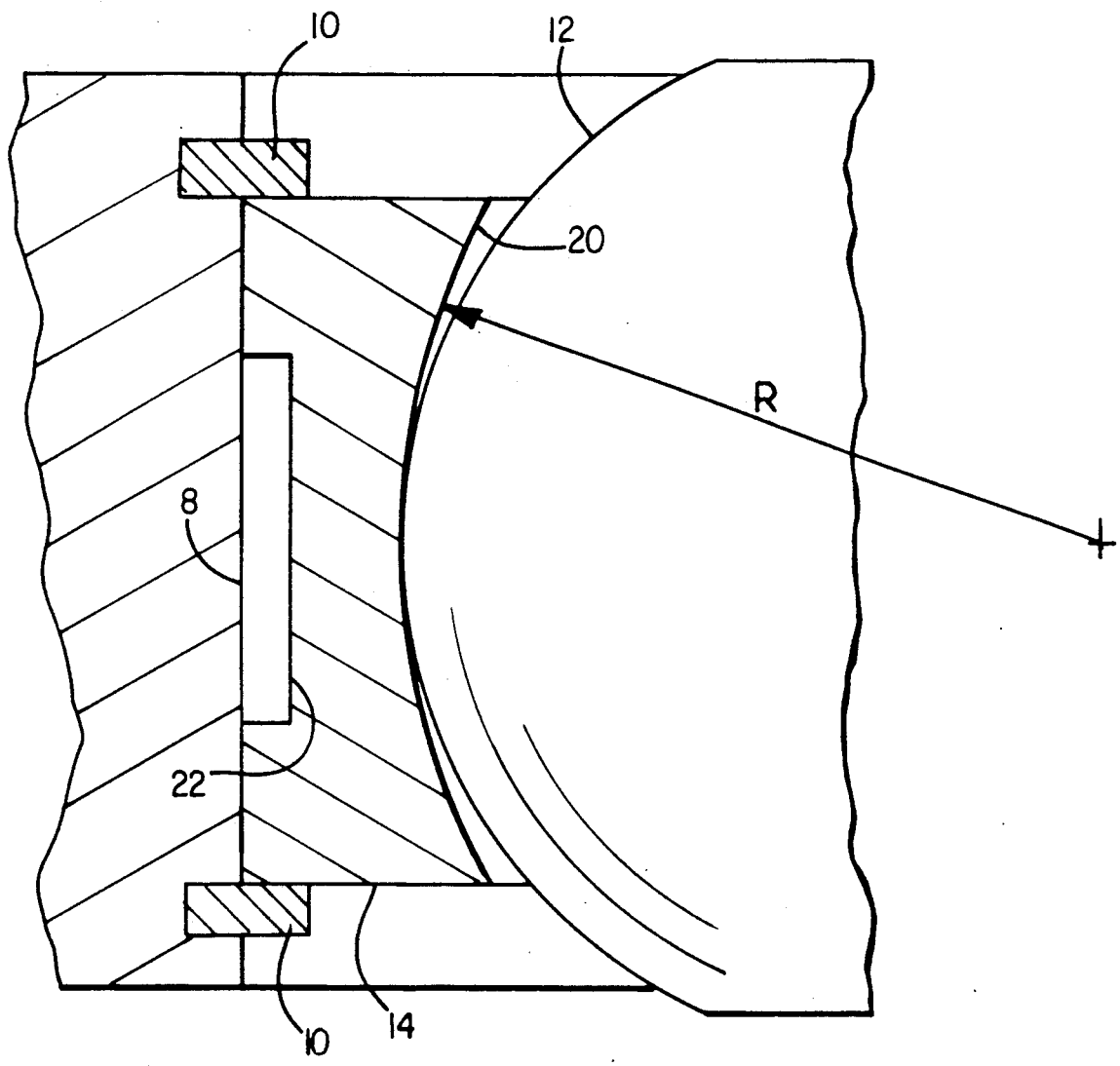
FIG. 5 shows the relative sizes of the curvatures of the seat and the ball depicted in FIG. 2.

As shown in FIGS. 3 and 5, split race 14 has a relief region 22 machined into its outer circumference. Relief region 22 is, e.g., approximately 0.5 inch wide and 0.003 inch deep.

Ball 12 has a thin dense chrome plate on its outer surface (e.g., approximately 0.0002-0.0004 inch thick) with a ball spherical finish of, e.g., 32-45 AA for improved wear resistance and lubricant retention under reversing loads. Split race 14 is made, e.g., of a thru-hardened 52100 steel so as to provide improved stress level capability and higher elasticity in comparison to softer, swaged steel races. Seat 20 may also be treated to increase its wear resistance. During assembly, bearing 6 is pre-lubricated, e.g., with a synthetic hydrocarbon grease with 3% molybdenum disulfide and 10% graphite added for increased static load capability.

Relief region 22 and the slightly larger radius of curvature of seat 20 allow race 14 to deflect outwardly by a controlled amount under applied load conditions. When a load is applied to ball 12, it is pushed into seat 20. Relief region 22 permits race 14 to deflect outwardly thereby relieving some of the pressure at the interface between ball 12 and race 14. The outward deflection of race 14 results in a slight reduction in the radius of curvature of seat 20 so that it more closely conforms to ball 12 thereby increasing the surface area over which the increased loading on seat 20 is absorbed. The result is reduced wear on the coatings on seat 20 and ball 12.

Figure 4:
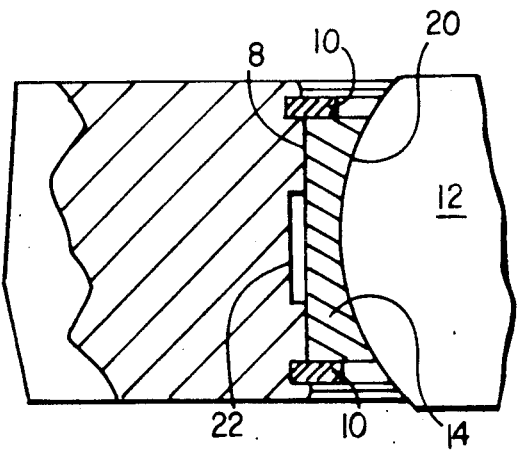
FIG. 4 shows an alternative location for the relief region.

Other embodiments are within the following claims. For example, instead of machining relief region 22 into race 14, relief region 22 can be formed in the wall of bore 8 as shown in FIG. 4.

What is claimed is:

1. A self-aligning bearing comprising:
   a first member having a convex bearing surface; and
   a second member having a concave bearing seat that receives the convex bearing surface of the first member, said second member also having a compliant relief region adjacent to and spaced apart from said concave seat, said second member comprising a metal material in which said concave bearing seat is formed, said relief region being located in a region about the midline of said concave seat and serving to permit deflection of said concave seat in response to loading on the first member so as to reduce susceptibility to pound out.

2. The self-aligning bearing of claim 1 wherein said second member comprises:

a race member having the concave seat on one side and an outside surface on an opposed side; and a support member holding said race member, the support member having a mounting surface that abuts the outside surface of said race member, wherein said compliant relief region is defined between said outside surface and said mounting surface.

3. The self-aligning bearing of claim 2 wherein said concave seat is treated to increase its wear resistance.

4. The self-aligning bearing of claim 2 wherein said convex bearing surface is treated to increase its wear resistance.

5. The self-aligning bearing of claim 2 wherein said compliant relief region is a cavity formed in said outside surface.

6. The self-aligning bearing of claim 5 wherein said convex bearing surface is spherically shaped with a radius R.

7. The self-aligning bearing of claim 6 wherein said concave seat is spherically shaped with a radius slightly greater than R so as to provide a line contact between said convex bearing surface and said concave bearing seat when said self-aligning bearing is assembled.

8. The self-aligning bearing of claim 5 wherein said concave seat is treated to increase its wear resistance.

9. The self-aligning bearing of claim 5 wherein said convex bearing surface is treated to increase its wear resistance.

10. The self-aligning bearing of claim 2 wherein said compliant relief region is a cavity formed in said mounting surface.

11. The self-aligning bearing of claim 10 wherein said convex bearing surface is spherically shaped with a radius R.

12. The self-aligning bearing of claim 11 wherein said concave seat is spherically shaped with a radius slightly greater than R so as to provide a line contact between said convex bearing surface and said concave bearing seat when said self-aligning bearing is assembled.

13. The self-aligning bearing of claim 10 wherein said concave seat is treated to increase its wear resistance.

14. The self-aligning bearing of claim 10 wherein said convex bearing surface is treated to increase its wear resistance.

* * * * *